United States Patent
Fürst

(10) Patent No.: US 9,725,087 B2
(45) Date of Patent: Aug. 8, 2017

(54) SAFETY DEVICE FOR A MOTOR VEHICLE AND ASSOCIATED OPERATING METHOD

(71) Applicant: Audi AG, Ingolstadt (DE)

(72) Inventor: Franz Fürst, Buxheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/109,548

(22) PCT Filed: Nov. 5, 2014

(86) PCT No.: PCT/EP2014/002959
§ 371 (c)(1),
(2) Date: Jul. 1, 2016

(87) PCT Pub. No.: WO2015/124162
PCT Pub. Date: Aug. 27, 2015

(65) Prior Publication Data
US 2016/0325741 A1  Nov. 10, 2016

(30) Foreign Application Priority Data

Feb. 22, 2014 (DE) .................. 10 2014 002 540

(51) Int. Cl.
*B60R 22/00* (2006.01)
*B60W 30/08* (2012.01)
(Continued)

(52) U.S. Cl.
CPC ......... *B60W 30/08* (2013.01); *B60R 21/0134* (2013.01); *B60W 30/09* (2013.01);
(Continued)

(58) Field of Classification Search
CPC ...... B60W 30/08; B60W 30/09; B60W 50/12; B60W 10/18; B60W 10/12; B60W 10/20;
(Continued)

(56) References Cited

U.S. PATENT DOCUMENTS 5,835,873 A * 11/1998 Darby .................... B60R 21/01
180/268
6,370,461 B1 * 4/2002 Pierce .................. B60R 21/013
280/734
(Continued)

FOREIGN PATENT DOCUMENTS

DE  19749838 A1  6/1999
DE  102004038734 A1  2/2006
(Continued)

OTHER PUBLICATIONS

International Search Report and Written Opinion of the International Searching Authority directed to related International Patent Application No. PCT/EP2014/002959, with attached English-language translation, mailed Feb. 5, 2015; 18 pages.
(Continued)

*Primary Examiner* — Shardul Patel
(74) *Attorney, Agent, or Firm* — Sterne, Kessler, Goldstein & Fox P.L.L.C.

(57) ABSTRACT

Safety device for a motor vehicle, having at least one sensor which is configured to detect an impending impact or an impending collision and possibly to generate a triggering signal, and having a control device which is configured to trigger a protective device if a triggering signal is present, wherein the safety device is configured to check whether the predicted impact or the collision has taken place within a predicted time period, and to transfer the motor vehicle into a safe state in the case of erroneous triggering.

13 Claims, 2 Drawing Sheets

(51) Int. Cl.
  *B60R 21/0134* (2006.01)
  *B60W 30/09* (2012.01)
  *B60W 50/12* (2012.01)
  *B60R 21/01* (2006.01)
  *B60W 10/18* (2012.01)
  *B60W 10/20* (2006.01)
  *B60W 10/30* (2006.01)

(52) U.S. Cl.
  CPC .... *B60W 50/12* (2013.01); *B60R 2021/01211* (2013.01); *B60R 2021/01272* (2013.01); *B60R 2021/01286* (2013.01); *B60W 10/18* (2013.01); *B60W 10/20* (2013.01); *B60W 10/30* (2013.01); *B60W 2520/105* (2013.01); *B60W 2710/18* (2013.01); *B60W 2710/20* (2013.01); *B60Y 2300/085* (2013.01)

(58) Field of Classification Search
  CPC .......... B60W 10/30; B60W 2520/105; B60W 2710/20; B60R 21/0134; B60R 2021/01211; B60R 2021/01286; B60Y 2300/085
  USPC ............................................. 701/48; 180/275
  See application file for complete search history.

(56) References Cited

U.S. PATENT DOCUMENTS

| | | | | |
|---|---|---|---|---|
| 7,565,242 B2* | 7/2009 | Lucas | ................ | B60R 21/0134 701/300 |
| 7,975,798 B2* | 7/2011 | Lucas | ................ | B60R 21/0134 180/275 |
| 8,577,550 B2* | 11/2013 | Lu | ........................ | B60W 10/06 340/435 |
| 9,150,200 B2 | 10/2015 | Urhahne | | |
| 2002/0105416 A1* | 8/2002 | Kore | ................... | B60R 21/013 340/425.5 |
| 2002/0112912 A1* | 8/2002 | Napier | ................... | B60R 21/01 180/275 |
| 2003/0060980 A1* | 3/2003 | Prakah-Asante | ...... | G08G 1/166 701/301 |
| 2003/0139866 A1* | 7/2003 | Frimberger | ............ | B60K 28/14 701/45 |
| 2003/0149530 A1* | 8/2003 | Stopczynski | ......... | B60R 21/013 701/301 |
| 2004/0039513 A1* | 2/2004 | Knoop | ..................... | B60T 7/22 701/70 |
| 2006/0226640 A1* | 10/2006 | Prakah-Asante | . | B60R 21/01558 280/735 |
| 2009/0038873 A1* | 2/2009 | Lucas | ................. | B60R 21/0134 180/275 |

FOREIGN PATENT DOCUMENTS

| | | |
|---|---|---|
| DE | 102004058663 A1 | 6/2006 |
| DE | 4320226 B4 | 8/2010 |
| DE | 102009040413 A1 | 3/2011 |
| DE | 102011114297 A1 | 3/2013 |
| DE | 102012206725 A1 | 10/2013 |
| EP | 2657921 A1 | 10/2013 |

OTHER PUBLICATIONS

International Preliminary Report on Patentability directed to related International Patent Application No. PCT/EP2014/002959, with attached English-language translation, mailed Jan. 18, 2016; 12 pages.
English-language Abstract of German Patent Publication No. 19749838 A1, published Jun. 2, 1999; 1 page.
English-language Abstract of German Patent Publication No. 4320226 A1, published Jan. 5, 2005; 2 pages.
English-language Abstract of German Patent Publication No. 102009040413 A1, published Mar. 10, 2011; 2 pages.
English-language Abstract of German Patent Publication No. 102011114297 A1, published Mar. 28, 2013; 2 pages.
English-language Abstract of European Patent Publication No. 2657321 A1, published Oct. 30, 2013; 2 pages.

* cited by examiner

SAFETY DEVICE FOR A MOTOR VEHICLE AND ASSOCIATED OPERATING METHOD

TECHNICAL FIELD

The invention relates to a safety device for a motor vehicle with at least one sensor which is designed to detect an impending impact or an impending collision and to produce an initiation signal if necessary, and with a control device which is designed to initiate a protective device upon the presence of in initiation signal.

BACKGROUND

Recently, motor vehicles comprise different safety devices which are capable of detecting in a predictive manner an impending accident in the form of an impact on an obstacle or in the form of a collision with another traffic participant so that a protective device can be initiated already before the occurrence of the accident event in time. An example for such a protective device is an airbag arranged in the inner compartment of the motor vehicle. Airbag systems belong to the passenger retention systems and comprise a gas generator which fills a plastic bag with a gas within a few milliseconds. Another example for such protective devices is a seat belt tensioner, which is coupled to an electrical and/or pyrotechnical actuator. Furthermore, body components, for example a front flap can be moved upon a detected, impending accident in order to form a deformation space between the front flap and the motor space located underneath the latter, which can reduce injuries of involved traffic participants.

Since such protective devices must be initiated already before an impact or a collision has taken place, there is the possibility of a false initiation, i.e. a protective device initiated by a predicted impact does not take place subsequently, for example, since another traffic participant or the driver himself initiated an avoidance maneuver. However, in such instances the protective device is initiated by the control device so that, for example, an airbag is deployed or a seat belt tensioner is activated or a front flap is brought into an elevated protective position. In these instances there is the danger that the driver, who is usually confronted for the first time with such protective devices, becomes frightened so that he executes uncontrolled steering movements or displays other reactions that endanger him or other traffic participants. There is therefore the danger that as a consequence of a false initiation of a protective device a dangerous situation or even an accident occurs.

The invention is therefore based on the object to provide a safety device for a motor vehicle through which a dangerous situation is prevented in case of a false triggering of a protective device.

SUMMARY

In order to solve this problem the invention provides for a safety device of the initially cited type that is designed to check whether the predicted impact or the collision took place within a predicted time frame and to bring the motor vehicle into a safe state.

The invention is based on the recognition that immediately after a false initiation of a protective device, for example, after the false initiation of an airbag, a dangerous situation exists since the driver usually has never before experienced such a false initiation. This applies to an airbag arranged in the vehicle cabin, for example an airbag built into steering wheel or a side airbag as well as to an outside airbag arranged in the outer area of the vehicle which is ignited before the occurrence of a collision in order to expand the deformation zone.

There is therefore the danger that he performs uncoordinated or uncontrolled steering or pedal actuations that could lead to a dangerous situation or even to an accident. There is the danger for other persons that they become frightened and no longer direct their attention to the road, the vehicle or to other traffic participants, which can also cause dangerous situations. The safety device of the invention eliminates this problem in that it assumes control of the motor vehicle upon a detected false initiation and puts it into an automatic driving mode, as a result of which the motor vehicle is brought into a safe state. According to the invention the driver is excluded at least temporarily from driving the motor vehicle since the motor vehicle is being driven after a detected false initiation by the safety device.

Regarding the safety device of the invention, it is preferred that it is constructed to detect a false initiation of the protective device, in particular at least of one airbag and/or at least one seat belt tensioner using sensor data which preferably comes from at least one acceleration sensor and/or from at least one deformation sensor.

It can be reliably detected by an acceleration sensor or alternatively by a deformation sensor whether an impact or a collision has taken place. Even other sensors can be used with certain limitations, for example, sensors of the surroundings such as an optical sensor, camera, radar sensor or an ultrasonic sensor that are a component of driver assistance systems. In as far as none of these existing sensors supplies a sensor signal indicating a collision within the predicted time frame for the collision it can be concluded from the above that a false initiation has taken place. In this case the motor vehicle is put into the safe state by the safety device.

In order to eliminate the dangerous situation present after a false initiation, it can be provided that the placing of the motor vehicle into the safe state comprises the carrying out of a secure emergency stop maneuver. The safety device therefore checks how, starting from the instantaneous position, speed and the instantaneous traffic in the surroundings of the motor vehicle, an emergency stop maneuver can be initiated in the simplest way. If sufficient room is present, the motor vehicle can be braked and brought to a stop upon a hard shoulder, a parking place or some other suitable free surface. In other instances, for example, if no suitable spot is present for an emergency stop maneuver, the travel of the motor vehicle is continued at first, optionally with reduced speed until a suitable position for an emergency stop maneuver has been reached. In order to inform the driver, when the safety device has taken over the driving of the vehicle in this state appropriate optical or acoustical information is outputted to the driver.

If the motor vehicle is equipped with a navigation system the emergency stop maneuver carried out by the safety device of the invention can comprise the determining of a minimal risk stopping position from predictive stretch data of the motor vehicle and the approaching of the stopping position. It is important here that the instantaneously existing dangerous situation is rendered safe without other traffic participants being endangered and in addition the attempt is made to stop the motor vehicle as soon as possible at the determined stopping position.

In order to prevent that the driver, who may have been frightened by the initiation of the protective device, performs any non-optimal operating procedure, it is preferred that the safety device is constructed to move into the secure state independently of a steering or pedal activation by the driver. Therefore, the control of the motor vehicle in this state is assumed completely by the safety device and any activations made by the driver are ignored.

In addition, the invention relates to a method for the operation of a safety device for a motor vehicle with the following steps: detection of an impending impact or an impending collision by at least one sensor which generates an initiation signal, initiation of a protective device upon the presence of an initiation signal by a control device. The method of the invention is distinguished in that the safety device checks whether the predicted impact or the collision took place within a predicted time frame and changes the motor vehicle upon a false initiation into a safe state.

It is preferred in the method of the invention that the safety device detects a false initiation of the protective device, in particular a false initiation of at least one airbag or of at least one seat belt tensioner using sensor data coming preferably from at least one acceleration sensor and/or from at least one deformations sensor.

It can also be provided in the scope of the invention that the safety device carries out a secure emergency stop maneuver in the framework of moving the motor vehicle into the safe state. It is preferable in the method of the invention that a minimal risk stopping position is determined from predictive stretch data of the motor vehicle and that the stopping position is approached in the framework of the emergency stop maneuver.

In the method according to the invention the safety device moves the motor vehicle into the safe state preferably independently of a steering or pedal activation by the driver. Other advantages and details of the invention are explained in the following using an exemplary embodiment with reference made to the drawings.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments. The drawings are schematic views in which.

DETAILED DESCRIPTION

Figure 1:
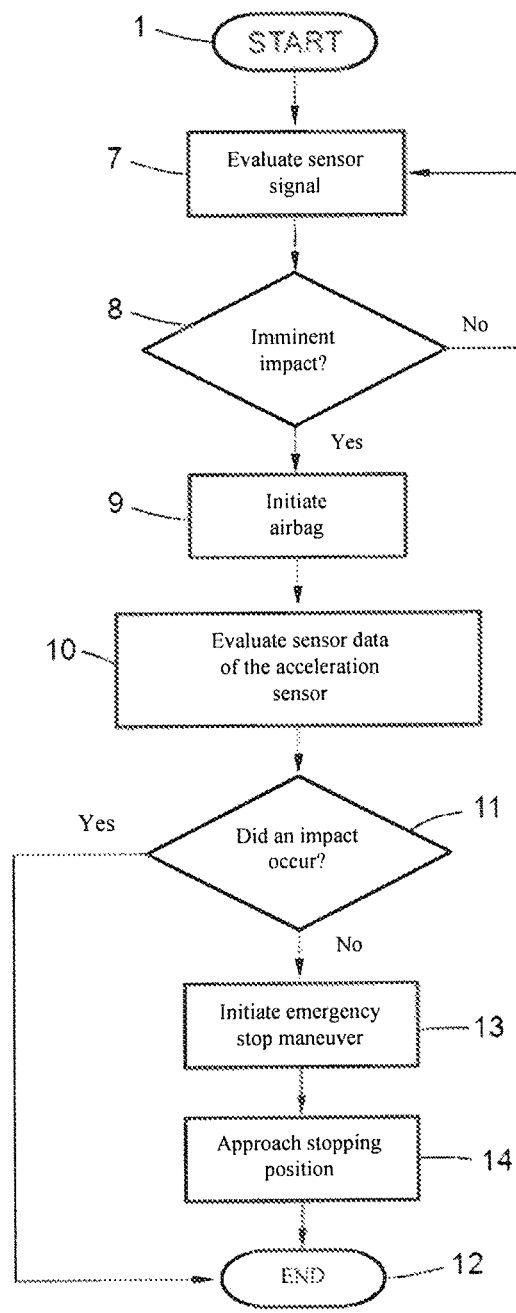
FIG. 1 illustrates a flowchart with the essential steps of the method of the invention.
Figure 2:
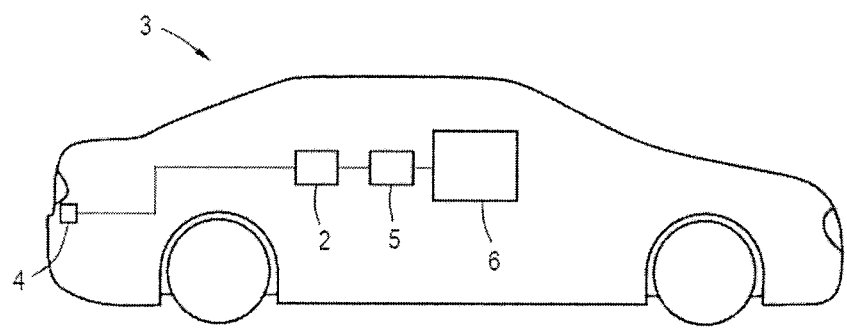
FIG. 2 illustrates a schematic view of the safety device according to the invention which is part of a motor vehicle.

The safety device and the associated operating method are explained using the flow chart of FIG. 1 and the schematic view of the safety device in FIG. 2.

After the start 1 of the method permanent signals from sensors 4 are transmitted to the safety device 2, which is a component of a motor vehicle 3 in order to detect whether an impact or a collision is imminent. Such sensors 4 are known and are used to control the initiation of protective devices such as airbags or seat belt tensioners. They are, for example, an acceleration sensor or several acceleration sensors arranged at different positions in the motor vehicle 3. Alternatively or additionally, an impending impact or an impending collision can also be detected by an optical sensor such as a camera with an image processing unit or a radar sensor or an ultrasonic sensor. These sensors can also be used in combination in order to prevent false initiations and to minimize their danger.

The sensor signals made available by the sensors 4 are supplied to the safety device 2 and evaluated by it. If the evaluation shows that an impact or a collision is to be expected within a short impending time frame, the sensor signal, which can also optionally also be a processed signal into which the raw signals of different sensors entered, is evaluated as an initiation signal. The safety device 2 comprises a control device 5 that is coupled to a protective device constructed in the exemplary embodiment shown as airbag 6. Upon the presence of the initiation signal the control device 5 initiates the airbag 6.

Referring to FIG. 1, after the start of 1 of the method the sensor signal is evaluated in step 7 and in the next step 8 a check is made whether an impact is imminent. If no impact is imminent, the method switches back to the previous step so that a permanent evaluation of the sensor signal supplied from the sensor 4 takes place. However, if it was decided in step 8 that an impact is imminent, the airbag 6 is initiated in step 9.

It can happen in certain cases that a predicted collision does not occur, for example, because another traffic participant or the driver of the motor vehicle 3 equipped with the safety device 2 initiated a maneuver of braking, steering or avoidance, as a result of which a collision could be avoided.

In step 10 sensor data of the sensor 4, which is constructed as an acceleration sensor, is subsequently evaluated by the safety device 2. If the collision has actually taken place within a predicted time frame, this can be detected by the acceleration sensor 4. If the evaluation of the sensor data center 4 supplies the result that an impact actually took place, the method is terminated in step 12. On the other hand, if the decision 11 resulted in the fact that no impact took place, an emergency stop maneuver is initiated by the safety device 2 in step 13. The emergency maneuver serves to move the motor vehicle 3 into a safe state since a driver is usually frightened upon the initiation of a protective device, in particular upon the deploying of the airbag 6, so that there is the danger that he will not dedicate the necessary attention to the instantaneous traffic situation, which increases the danger of an accident.

A stopping position is approached in the framework of the moving of the motor vehicle 3 into the safe state under the control of the control device 5 (step 14). In this state the motor vehicle 3 is automatically controlled by the safety device 2. The safety device 2 is capable of detecting the surroundings of the motor vehicle 3 by the already-mentioned optical sensors and by other sensors for detecting the surroundings such as radar sensors or ultrasonic sensors. As a result, the safety device 2 can control the motor vehicle 3 in such a manner that the safe stopping position can be approached in step 14. The safety device 2 takes into account predictive stretch data of the motor vehicle 3 which is transmitted to it from a navigation device in order to set a stopping position in which the risk of danger or of an accident is minimized.

If the driver should make any operating inputs in this state in which the motor vehicle 3 is automatically being driven by the safety device such as a moving of the steering wheel, a pedal activation or an activation of the turn signal, they are ignored until the secure stopping position has been reached, whereupon the method is terminated in step 12.

Figure 3:
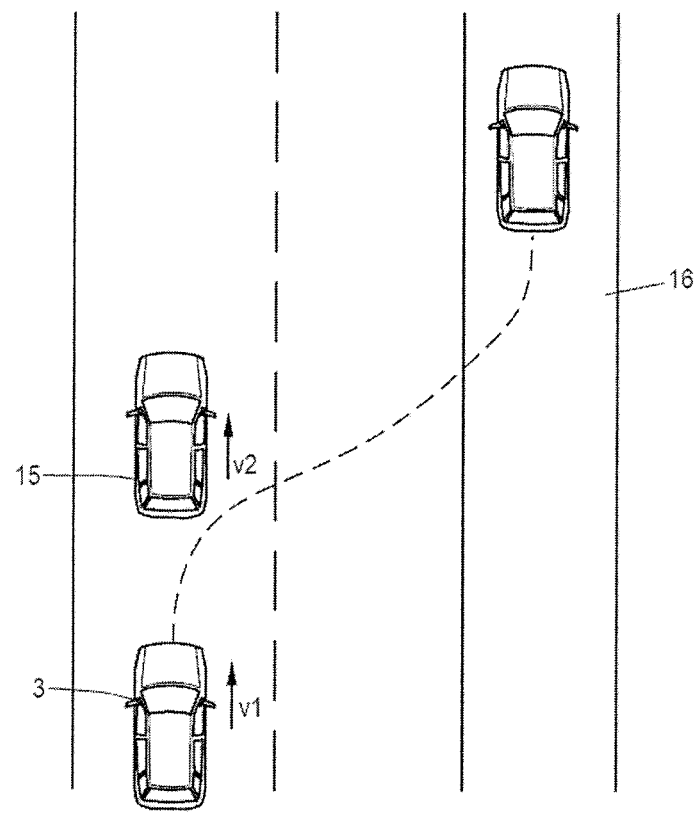
FIG. 3 illustrates a traffic situation in which the safety device according to the invention is activated.

FIG. 3 shows a traffic situation in which the method for the operation of the safety device 2 is carried out.

Another vehicle 15 whose speed v2 is significantly less than the speed v1 of the vehicle 3 is in front of the motor vehicle 3. The preceding vehicle 15 is detected by the sensors 4 of the motor vehicle 3. If the evaluation of the detected interval and of the detected speed of the preceding vehicle 15 and the detected relative speed show that a collision is imminent, the airbag 6 is initiated by the control device 5. If, on the other hand no collision can be detected by the acceleration sensors within the set time frame, the safety device 2 recognizes that there is a false initiation of the airbag 6. In this situation the motor vehicle 3 is moved into a safe state. FIG. 3 shows the trajectory 16 in dotted lines along which the motor vehicle 3 is steered by the safety device 2. The vehicle 3 is steered from the left lane over the right lane to the hard shoulder 16, where it is braked to a stop and the safe stopping position is achieved.

The invention claimed is:

1. A motor vehicle, comprising:
    at least one sensor configured to detect an impending impact or an impending collision and produce an initiation signal if necessary;
    a control device configured to initiate a protective device upon a presence of the initiation signal; and
    a safety device configured to determine whether the detected impending impact or the detected impending collision took place within a predicted time frame, and move the motor vehicle into a safe state.

2. The motor vehicle of claim 1, wherein the safety device is further configured to detect a false initiation of the protective device based on sensor data from at least one of an acceleration sensor and a deformation sensor, wherein the protective device is an airbag or a seat belt tensioner.

3. The motor vehicle of claim 1, wherein moving the motor vehicle into the safe state comprises performing a secure emergency stop maneuver.

4. The motor vehicle of claim 3, wherein the secure emergency stop maneuver comprises determining a minimal risk stopping position based on predictive stretch data of the motor vehicle, and approaching of the determined minimal risk stopping position.

5. The motor vehicle according to claim 1, wherein the safety device is further configured to move the motor vehicle into the safe state, independently of a steering action or pedal activation by a driver.

6. The motor vehicle of claim 1, wherein the safety device is further configured to move the motor vehicle into the safe state after determining that the detected impending impact or the detected impending collision did not take place within the predicted time frame.

7. The motor vehicle of claim 1, wherein moving the motor vehicle into the safe state comprises bringing the motor vehicle to a stop based on a position of the motor vehicle, a speed of the motor vehicle, and traffic surrounding the motor vehicle.

8. A method for operating a safety device for a motor vehicle, the method comprising:
    detecting an impending impact or an impending collision using at least one sensor, wherein the sensor generates an initiation signal;
    initiating a protective device based on a presence of the initiation signal from a control device;
    determining whether the detected impending impact or the detected impending collision took place within a predicted time frame; and
    moving the motor vehicle into a safe state based on a false initiation of the protective device.

9. The method of claim 8, further comprising:
    detecting the false initiation of the protective device based on sensor data from at least one of an acceleration sensor and a deformation sensor, wherein the protective device is an airbag or a seat belt tensioner.

10. The method of claim 8, wherein moving the motor vehicle into the safe state further comprises performing a secure emergency stop maneuver.

11. The method of claim 10, wherein performing the secure emergency stop maneuver comprises:
    determining a minimal risk stopping position based on predictive stretch data of the motor vehicle, and approaching the determined minimal risk stopping position.

12. The method of claim 8, wherein moving the motor vehicle into the safe state occurs independently of a steering action or pedal activation by a driver.

13. The method of claim 8, further comprising:
    detecting the false initiation of the protective device based on the determining whether the detected impending impact or the detected impending collision took place within the predicted time frame.

* * * * *